US012316999B2

United States Patent
Lu et al.

(10) Patent No.: US 12,316,999 B2
(45) Date of Patent: May 27, 2025

(54) SYSTEMS AND METHODS FOR DETECTION AND DISPLAY OF WHITEBOARD TEXT AND/OR AN ACTIVE SPEAKER

(71) Applicant: HP (Chongqing) Co., Ltd, Chongqing (CN)

(72) Inventors: Xi Lu, Beijing (CN); Tianran Wang, Beijing (CN); Hailin Song, Beijing (CN); Hai Xu, Beijing (CN); Yongkang Fan, Beijing (CN)

(73) Assignee: HP (Chongqing) Co., Ltd, Chongqing (CN)

( * ) Notice: Subject to any disclaimer, the term of this patent is extended or adjusted under 35 U.S.C. 154(b) by 484 days.

(21) Appl. No.: 17/912,028

(22) PCT Filed: May 12, 2020

(86) PCT No.: PCT/CN2020/089759
§ 371 (c)(1),
(2) Date: Sep. 15, 2022

(87) PCT Pub. No.: WO2021/226821
PCT Pub. Date: Nov. 18, 2021

(65) Prior Publication Data
US 2023/0186654 A1 Jun. 15, 2023

(51) Int. Cl.
*H04N 7/14* (2006.01)
*G06V 10/25* (2022.01)
(Continued)

(52) U.S. Cl.
CPC ............. *H04N 7/147* (2013.01); *G06V 10/25* (2022.01); *G06V 20/62* (2022.01); *G10L 25/78* (2013.01); *H04N 23/69* (2023.01); *H04N 23/695* (2023.01)

(58) Field of Classification Search
CPC ...... H04N 7/147; H04N 23/69; H04N 23/695; G06V 10/25; G06V 20/62; G10L 25/78;
(Continued)

(56) References Cited

U.S. PATENT DOCUMENTS 6,731,788 B1   5/2004  Agnihotri et al.
11,611,773 B2 * 3/2023  Al-maadeed ........ G06V 10/764
(Continued)

FOREIGN PATENT DOCUMENTS

CA   2659698 A1 *  9/2009  ......... G06Q 10/0637
CN   1295690 A     5/2001
(Continued)

OTHER PUBLICATIONS

International Search Report issued in corresponding international application No. PCT/CN2020/089759 mailed Feb. 19, 2021 (3 pages).
(Continued)

*Primary Examiner* — Mahendra R Patel
(74) *Attorney, Agent, or Firm* — Quarles & Brady LLP (57) ABSTRACT

Systems and methods are provided for identifying and displaying whiteboard text and/or an active speaker in a video-based presentation, e.g., a video conference. Video images of an environment including a whiteboard may be captured by a video camera system. The video images may be analyzed to detect at least one text-containing area in the environment. Each text-containing area may be analyzed to determine whether it is an area of a whiteboard. When a text-containing area is identified as a whiteboard area, an area of view including the text-containing whiteboard area may be selected for display, e.g., a subset of the full frame captured by the video system. A video feed from the video camera system may be controlled to display the selected area of view at a client device, to provide a useful view of the
(Continued)

whiteboard text and/or a speaking person located near the whiteboard text.

22 Claims, 7 Drawing Sheets

(51) Int. Cl.
    *G06V 20/62*     (2022.01)
    *G10L 25/78*     (2013.01)
    *H04N 23/69*     (2023.01)
    *H04N 23/695*     (2023.01)

(58) Field of Classification Search
    CPC .............. H04L 12/1827; H04M 3/563; H04M 2201/41; H04M 2203/509; H04M 7/0027
    USPC .......................................................... 382/176
    See application file for complete search history.

(56) References Cited

U.S. PATENT DOCUMENTS

| | | | | |
|---|---|---|---|---|
| 11,695,812 | B2 * | 7/2023 | Port ..................... | H04N 7/0127 348/14.08 |
| 2010/0259676 | A1 * | 10/2010 | Swan ................. | H04N 21/4884 348/468 |
| 2015/0009278 | A1 * | 1/2015 | Modai ................... | G06V 40/23 348/14.08 |
| 2015/0222859 | A1 * | 8/2015 | Schweid ................ | G06V 20/52 348/148 |
| 2017/0324932 | A1 * | 11/2017 | Tangeland ............ | G06F 1/1605 |
| 2017/0372449 | A1 * | 12/2017 | Yarvis .................... | H04N 5/265 |
| 2018/0137119 | A1 * | 5/2018 | Li .......................... | H04N 23/63 |
| 2019/0356883 | A1 * | 11/2019 | Theien .................. | H04N 7/152 |

FOREIGN PATENT DOCUMENTS

| | | | | |
|---|---|---|---|---|
| CN | 1685358 | A | | 10/2005 |
| CN | 101533474 | A | | 9/2009 |
| CN | 101681564 | A * | 3/2010 | .............. G09B 7/00 |
| CN | 103425973 | A | | 12/2013 |
| CN | 104284133 | A | | 1/2015 |
| CN | 105578100 | A * | 5/2016 | ............. G08C 17/02 |
| CN | 107864354 | A | | 3/2018 |
| CN | 108933915 | A | | 12/2018 |
| CN | 110209873 | A * | 9/2019 | |
| GB | 2299478 | A * | 10/1996 | ............. H04N 5/222 |
| WO | WO-0137211 | A1 * | 5/2001 | ......... G06F 16/7844 |
| WO | WO-2015095754 | A1 * | 6/2015 | ............. G06F 16/35 |

OTHER PUBLICATIONS

Written Opinion of the International Searching Authority issued in corresponding international application No. PCT/CN2020/089759 mailed Feb. 22, 2021 (3 pages).

* cited by examiner

SYSTEMS AND METHODS FOR DETECTION AND DISPLAY OF WHITEBOARD TEXT AND/OR AN ACTIVE SPEAKER

TECHNICAL FIELD

The present invention relates to systems and methods for video-based detection of text on a whiteboard and control of a displayed video stream (e.g., in a video conference or other video presentation) based on the detected whiteboard text, e.g., to display an area of view including the detected whiteboard text and/or a nearby active speaker.

BACKGROUND

A whiteboard is a common tool used by a speaker for presenting text or other information to an audience, for example a live audience or a remote audience viewing a video feed of the presentation, either in real time (for example, in a video conference setting or other video live stream) or a playback of a recorded video stream. As used herein, "text" may include words, numbers, alphanumeric characters, symbols, shapes, drawings, or any other information handwritten or otherwise written, printed, or displayed on a physical medium.

Existing systems for displaying a presentation video feed (in real time or recorded) typically fail to effectively display text on the whiteboard that may be relevant to the presentation, such as text written by the speaker before or during the presentation. Some existing systems are configured to track the location of the speaker (or more particularly, the speaker's face) in real time, and pan and zoom the camera or the displayed camera view to focus on the tracked speaker. However, such systems may omit the information presented on a whiteboard used by the speaker.

Other existing systems maintain a full view of the room or environment in which the speaker is located. However, it is often difficult or impossible for a viewer to identify or decipher the information on the whiteboard based on a full room view, as the text on the whiteboard may appear too small and/or at a low resolution on the viewer's display device.

The detection of a whiteboard in video images is difficult due to the various shapes and sizes of whiteboard, and may be further complicated by the presence of other objects within the camera view that include text, for example, televisions or other screens, posters, signs, etc.

Figure 1:
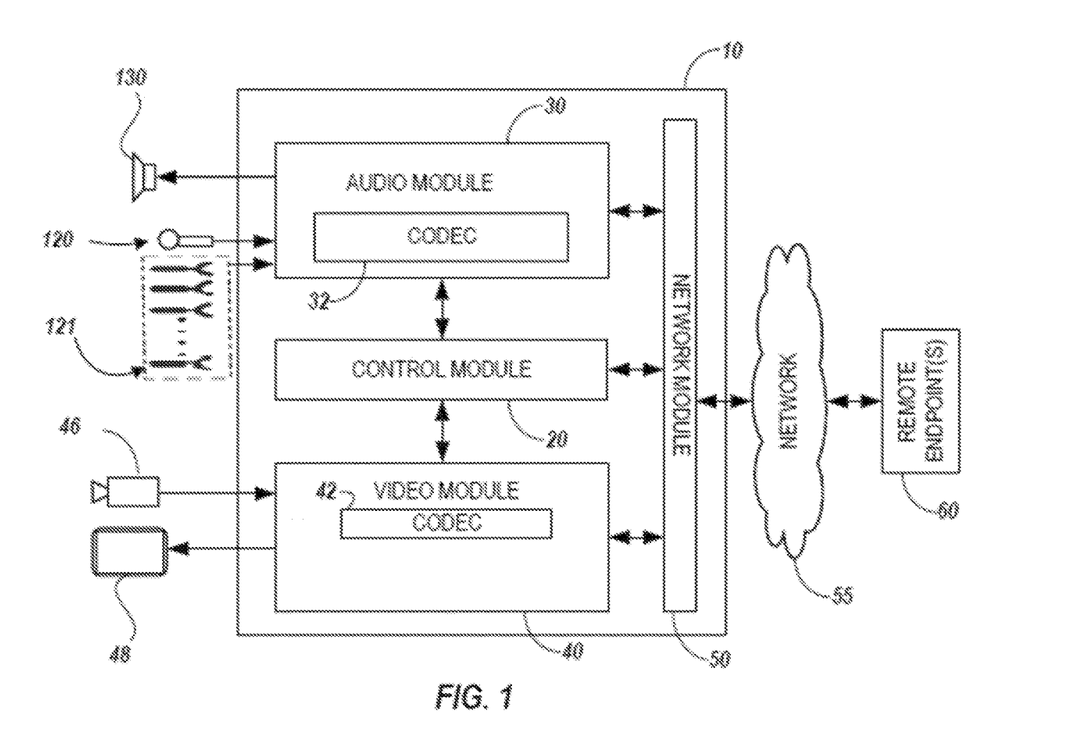
FIG. 1 shows a conventional method for automated video-based detection of a whiteboard and detection of text on the whiteboard.

FIG. 1 shows a conventional method 100 for automated video-based detection of a whiteboard and detection of text on the whiteboard. At 102, a conventional whiteboard detection analysis is performed on video images to identify the location of a whiteboard within the view of the video camera. After determining the whiteboard location, a conventional text detection analysis is performed at 104 to identify and/or decipher text on the whiteboard. However, in the conventional method, the whiteboard detection step 102 is often inaccurate or unsuccessful, as indicated by the "X" after step 102. For example, the conventional method may fail to locate a whiteboard or may erroneously identify a non-whiteboard object (e.g., a TV or other display screen, a poster, a sign, etc.) as a whiteboard.

Thus, based on the deficiencies of conventional automated whiteboard detection techniques, some video systems use a manually defined location of a whiteboard for defining the displayed area of the video feed. Of course, this requires manual intervention by a person, which may be inconvenient, impractical, or impossible, depending on the particular situation. Further, a clean whiteboard or its blank area is typically irrelevant to the presentation. Thus, showing the entire whiteboard regardless of the portion that includes text may result in an unnecessarily large view area, which unnecessarily reduces the size of the whiteboard text on the video display size, possibly making the text illegible to the viewer.

As a result, an object exists for improved system and methods for automated video-based whiteboard detection during a video presentation and providing a useful display of the whiteboard—for example, displaying a selected portion of the whiteboard including text or other information—in a video feed displayed to viewers of the presentation, e.g., in a video conference.

SUMMARY

The object is solved by the subject matter of the independent claims. The dependent claims and the following description describe various embodiments of the invention.

In one aspect, a system for identifying and displaying whiteboard text and/or an active speaker is provided. The system may include a video camera system including at least one camera, and a controller communicatively coupled to the video camera system. The camera(s) of the video camera system is/are configured to capture video images showing an environment including at least one whiteboard. The controller may include at least one processor. The controller is configured to receive a series of video images captured by the at least one camera of the video camera system, analyze one or more of such video image(s) to detect at least one text-containing area in the environment, analyze each text-containing area to determine whether the respective text-containing area is a text-containing whiteboard area, and select an area of view for display that includes an identified text-containing whiteboard area. The controller is then configured to generate a video feed from video images captured by the video camera system for display on a remote client device, and control the video feed to display the selected area of view that includes the text-containing whiteboard area.

A basic idea of the invention relates to detecting text on a whiteboard, including distinguishing whiteboard text from other text displayed on other objects in the camera view (e.g., text on a TV or display monitor, text on a sign or poster, or text on a wall), and automated control of a displayed video stream based on the detected whiteboard text, for example to display only the portion of the whiteboard that includes text and/or a speaking person.

The inventors have discovered that detecting all text-containing areas within the camera view, and then determining whether or not each text-containing area is an area of a whiteboard provides improved results over conventional systems that attempt to first detect a whiteboard in the camera view and then identify text on the whiteboard. For example, although deep learning techniques have improved the accuracy of object detection in recent years, there is no dataset of whiteboard detection objects sufficient to train a model to effectively detect a whiteboard, e.g., as distinguished from all other possible white- or light-colored objects in a room. In contrast, the inventors have discovered that detection of text in a real-world environment is much more accurate than detection of a whiteboard. However, text detection alone is not sufficient, as a room may include various other text-containing objects (e.g., TVs or other display monitors, signs, posters, etc.). Thus, the inventors have invented the technique of first detecting all text-containing areas within the camera view (e.g., conference room), and then determining whether each text-containing area is an area of a whiteboard.

The invention may provide a new and powerful feature to a video conference system. For example, using the improved detection of whiteboard text, a video camera or a feed from a video camera can be automatically panned and/or zoomed to focus on the whiteboard area including text, and ignoring blank areas of the whiteboard. In some systems the inventive whiteboard text detection may be combined with a talker tracking system for detecting or tracking the location of an active speaker (i.e., a presenter generating or interacting with the whiteboard text), such that the system may control the displayed video feed to show a selected area of the room including both the whiteboard text and the active speaker.

In another aspect, a method is provided for identifying and displaying whiteboard text. A series of video images captured by a video camera system including at least one camera are collected, wherein each video image shows an environment including at least one whiteboard. A controller communicatively coupled to the video camera system analyzes at least one video image of the series of video images to detect at least one text-containing area in the environment. After detecting at least one text-containing area in the environment, the controller analyzes each text-containing area to determine whether the respective text-containing area is a text-containing whiteboard area. In response to determining that a first text-containing area is a text-containing whiteboard area, the controller automatically selects an area of view for display that includes the text-containing whiteboard area. The controller generates a video feed from video images captured by the video camera system for display on a remote client device, and controls the video feed to display the selected area of view that includes the text-containing whiteboard area.

The details of one or more embodiments are set forth in the accompanying drawings and the description below. Other features will be apparent from the description, drawings, and from the claims.

BRIEF DESCRIPTION OF THE DRAWINGS

The present invention will be readily understood by the following detailed description in conjunction with the accompanying drawings, wherein like reference numerals designate like structural elements.

FIGS. 4A, 4B, and 4C show example selections of an area for display for three different scenarios, according to an example embodiment of the present invention; and FIG. 5 shows an example method for identifying and displaying whiteboard text on a client device, in an example environment including an active speaker presenting information using text on a whiteboard.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data and/or audio (signal) connection between at least two components, devices, units, processors, or modules. Such a connection may be direct between the respective components, devices, units, processors, or modules; or indirect, i.e., over intermediate components, devices, units, processors, or modules. The connection may be permanent or temporary; wireless or conductor based.

For example, a data and/or audio connection may be provided over direct connection, a bus, or over a network connection, such as a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a Bluetooth network connection and/or a DECT connection is used to transmit audio and/or data.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In video-based presentation or communication systems, such as video conference systems for example, a need exists for improved techniques for automated detection and display of text on a whiteboard. For example, there is a need for improved detection of whiteboard text as distinguished from blank areas of the whiteboard and distinguished from other objects in the camera view that include text, such as TVs or other monitors, signs, posters, etc. Accurate detection of whiteboard text allows a video feed (e.g., video stream) to be controlled to show only a selected portion of the whiteboard including text (e.g., excluding blank areas of the whiteboard), to thereby increase the displayed size and/or clarity of the text displayed on a client device.

In one aspect, a system is provided for identifying and displaying whiteboard text. The system may include a video camera system arranged in a presentation environment and a controller communicatively coupled to the video camera system and configured to control a video feed from the video camera system. The system may also include one or more client devices remote from the presentation environment and configured to display the video stream controlled by the controller.

The video camera system may include a single video camera or multiple video cameras, each configured to capture video images showing an environment including at least one whiteboard, for example a video conference room or other room including at least one active speaker (e.g., presenter) using a whiteboard for communicating information to at least one remote client, for example other participants in a video conference.

In some embodiments, the video camera system may include multiple video cameras spaced apart from each other in one or more directions to provide different view perspectives. For example, the video camera system may include multiple video cameras housed in a common housing. Each camera may be set or controlled to capture a full area of the presentation environment, or each camera may be set or controlled to capture different areas of the presentation environment. In addition, each camera may be controlled, e.g., panned, tilted, and/or zoomed, independent of each other camera.

In one embodiment, the video camera system may include (a) a first camera set to capture a full area of the presentation environment, for use in detecting a whiteboard text area and/or an active speaker in the environment, and (b) a second camera that is controlled (e.g., panned, tilted, and/or zoomed) to capture a selected partial area of the environment-including the whiteboard text area and/or the active speaker—for a video feed communicated to remote client(s).

The controller may include at least one processor, at least one memory or other data storage device, and software, firmware or other logic instructions executable by the at least one processor to perform any of the various functions disclosed herein. The controller may be embodied in a single computer, or may include multiple computers located together or remote from each other.

In some embodiments, the controller is located at the presentation environment. For example, the controller and the video camera system may be provided in a common housing located, e.g., configured to be mounted on a wall or placed on a table or desk in the presentation environment. In other embodiments, the controller is located at the presentation environment but in a separate housing from the video camera system. For example, the controller may be embodied as an add-on device configured to connect to an existing video camera system via a wired or wireless connection. In other embodiments, the controller is located remote from the presentation environment. For example, the controller may be provided in a client device remote from the presentation environment and connected to the video camera system via the internet or other suitable communications network. As another example, the controller may be remote from both the video camera system and client device(s), wherein the remote system components may be interconnected via the internet or other suitable communications network.

Client devices may include any computer device having a screen or other display device configured to display a video feed received from the controller. For example, client devices may include one or more TVs, monitors, desktop computers, laptops, tablets, smart phones, smart watches, or any other device configured to display a video feed. As noted above, in some embodiments, the controller may be provided in a client device. In such embodiments, the controller may receive a stream of video images from the video camera system that include a full area of the presentation environment, and generate a video feed including only a relevant portion of the full presentation environment area for display on the client device, e.g., a selected portion of the presentation environment area that includes a text-containing whiteboard area identified by the controller and/or an active speaker near the text-containing whiteboard area.

The controller may be configured to receive a series of video images captured by video camera(s) of the video camera system, analyze one or more of the video images to detect at least one text-containing area in the environment, then analyze each text-containing area to determine whether the respective text-containing area is a text-containing whiteboard area. After identifying a text-containing whiteboard area, the controller may select an area of view for display (at client device(s)) that includes the identified text-containing whiteboard area. The controller is further configured to generate a video feed from video images captured by the video camera system for display at client device(s) connected to the controller (via the internet or other suitable network), and control the video feed to display the selected area of view including the text-containing whiteboard area.

The controller may use any suitable tools or algorithms to detect one or more text-containing areas in the environment. For example, the controller may utilize text detection tools, for example, AdvancedEAST (https://github.com/huoyijie/AdvancedEAST). In one embodiment, the controller utilizes a high-speed feature extractor, for example, MobilenetV2. MobilenetV2 (https://arxiv.org/abs/1801.04381) is a lightweight network architecture that uses depthwise convolutions to replace original convolutions layers to filter features, which allows for the development of highly efficient models on a mobile device or other suitable platform. Another embodiment uses the VGG16 tool for feature extraction.

The controller may also use any suitable tools or algorithms to determine whether each identified text-containing area is an area of a whiteboard, e.g., as opposed to text on a TV/monitor, poster, sign, etc. For example, the controller may utilize a deep-learning model of the MobilenetV2 tool that has been trained using a collection of images of whiteboards and non-whiteboard objects (e.g., including objects that may commonly contain text or otherwise appear similar to a whiteboard).

In some embodiments the controller may first apply a color filter to eliminate any text-containing areas having a non-white background, such that each remaining text-containing area has a white background, and then determine whether each white-background text-containing area is a whiteboard area, e.g., using the deep-learning model of the MobilenetV2 tool discussed above. The color filter may be based on statistics of lightness and saturation of each text area, to identify and remove non-white areas. Using the color filter reduces the number of candidate text areas to be analyzed by the deep-learning model, and may use substantially less resources and/or cost than the whiteboard identification using the deep-learning model.

To control the video feed displayed at a client device, the controller may either (a) control optical parameter(s) of one or more of the video camera(s), or (b) digitally select and control a partial portion of video images that is displayed at the client device. With respect to the first option, the controller may for example control each camera to perform at least one of a physical pan, a physical tilt, or an optical zoom to capture a selected area of the presentation environment that includes a text-containing whiteboard area and/or an active speaker. In such embodiment, the video camera system may include (a) a first camera that continues to capture the presentation environment area, which may be used by the controller to detect a whiteboard text area and/or an active speaker and (b) a second camera controlled by the controller (e.g., panned, tilted, and/or zoomed) to focus on a selected area including the whiteboard text area and/or active speaker, wherein the video feed of the second camera is communicated to remote client(s) for display.

In some embodiments, in addition to detecting a text-containing whiteboard area, the controller is also configured to identify a speaking person (also referred to herein as an active speaker) in the environment, and automatically selects an area of view for display that includes both (a) at least a selected portion of the identified speaking person and (b) the text-containing whiteboard area. In some embodiments, if the controller identifies both a text-containing whiteboard area and an active speaker, the controller may determine whether to include both the whiteboard text area and the active speaker in the selected area for display or whether to include only the active speaker (and not the whiteboard text area), e.g., based on the distance between the speaker and the whiteboard text. For example, the controller may be configured to determine a distance between the detected speaker and the whiteboard text area; compare the determined distance to a defined threshold distance, and determine to include the whiteboard text area in the selected area for display only if the determined distance is less than the defined threshold distance. Examples of these features are shown in FIGS. 4A-4C, discussed below.

In one embodiment, if the controller identifies both a text-containing whiteboard area and an active speaker, the controller may determine a provisional view area that includes both the whiteboard text area and the detected speaker, and analyze this provisional view area to determine whether to display both the whiteboard text area and the speaker, or only the speaker. For example, the controller may analyze the provisional view area to determine a text size or a whiteboard area size of the whiteboard text area in the provisional view area, and may then select between the provisional view area (including both the whiteboard text area and the speaker) or a view area that includes only the speaker, based on the determined text size or whiteboard area size of the whiteboard text area.

The controller may be configured to identify an active speaker in the presentation environment using any suitable input data and analysis techniques. In some embodiments, the controller may detect an active speaker by analyzing video images from the video camera system. In other embodiments, the controller may detect an active speaker based on sound data received from one or more microphones, either alone or in combination with video analysis. In one embodiment, the system includes a microphone array including multiple microphones spaced apart from each other and/or arranged with different orientations, and the controller is configured to automatically detect an active speaker based at least on the sound data received from the microphone array. In one embodiment, the controller may include any systems and methods and provide any functionality for detecting and tracking an active speaker based on video analysis as disclosed in U.S. Pat. No. 8,248,448, entitled "Automatic Camera Framing for Videoconferencing" and filed May 18, 2010, the entire contents of which are hereby incorporated by reference for all purposes.

In another embodiment, the controller may include any systems and methods and provide any functionality for detecting and tracking an active speaker based on analysis of ultrasound signals and/or sound in the audible spectrum, as detected by one or more microphones, including any algorithms or techniques disclosed in U.S. Pat. No. 8,249,298, entitled "Ultrasonic Camera Tracking System and Associated Methods" and filed Oct. 15, 2007, the entire contents of which patent are hereby incorporated by reference for all purposes.

In another embodiment, the controller may include any systems and methods and provide any functionality for detecting and tracking an active speaker using video analysis and analysis of microphone signals (e.g., detected ultrasound signals and/or detected sound in the audible spectrum).

In another aspect, a method is provided for identifying and displaying whiteboard text. A series of video images captured by a video camera system is collected, wherein each video image shows an environment including at least one whiteboard. A controller analyzes at least one video image of the series of video images to detect at least one text-containing area in the environment. After detecting at least one text-containing area in the environment, the controller analyzes each text-containing area to determine whether the respective text-containing area is a text-containing whiteboard area. In response to determining that a first text-containing area is a text-containing whiteboard area, the controller automatically selects an area of view for display that includes the text-containing whiteboard area, generates a video feed from video images captured by the video camera system for display on a remote client device, and controls the video feed based on the selected area of view for display that includes the text-containing whiteboard area.

Figure 2:
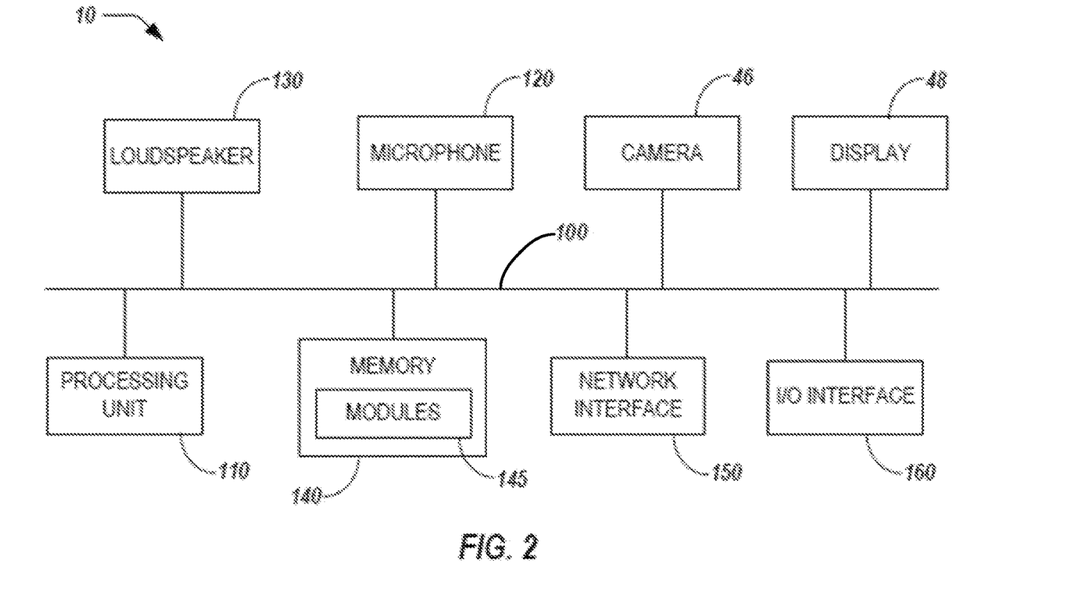
FIG. 2 shows an example system for identifying and displaying whiteboard text on a client device, according to an embodiment of the present invention.

FIG. 2 shows an example system 200 for identifying and displaying whiteboard text on a client device 250, according to an embodiment of the present invention. System 200 includes a controller 202, a video camera system 204 including one or more video cameras, and a microphone array 206 including one or more microphones. The video camera system 204 and microphone array 206 are located at a presentation environment 210 that includes a whiteboard 212 including text 214, a number of text-containing non-whiteboard objects 216A, 216B, and an active speaker 218. The video camera system 204 is arranged to capture video images of the presentation environment 210. A full frame captured by the video camera system 204 is indicated at 220. The microphone array 206 is arranged to capture wireless signals from the environment 210, including ultrasound signals (e.g., from an ultrasound transmitter worn or carried by the active speaker 218) and/or sound in the audible spectrum (e.g., speech or other audio from the active speaker 218), and generate and communicate to controller 202 signals representing or derived from such detected wireless signals. Wireless signals detected by microphone array 206, including ultrasound signals, sound in the audible spectrum, and/or other wireless signals, are referred to herein as "sound signals," and data communicated from microphone array 206 to controller 202 representing or derived from detected sound signals by microphone array 206 are referred to herein as "sound data."

Controller 202 is connected to the video camera system 204 and microphone array 206 by any suitable wired or wireless links for receiving video and sound data from video camera system 204 and microphone array 206. Controller 202 may also be connected to client device 250 by any suitable wired or wireless links, e.g., via a network 240 (e.g., the internet or other communications network).

Controller 202 may be integrated with video camera system 204 and/or microphone array 206 in a single device housing, or may be separate from video camera system 204 and microphone array 206, and may be located at the presentation environment 210, or provided in the client device 250, or may be remote from both the presentation environment 210 and client device 250.

Controller 202 may be configured to provide any of the controller functionality discussed herein. Controller 202 may include a whiteboard identification unit 230, a speaker tracking unit 232, and a video control unit 234. Whiteboard identification unit 230 includes hardware, software, and/or firmware for detecting a text-containing whiteboard area, for example to execute the algorithm shown in FIG. 3A discussed below. In the illustrated example, whiteboard identification unit 230 is configured to identify text 214 on whiteboard 212, as well as the text on the non-whiteboard objects 216A and 216B, and then analyze each of these three text-containing areas to determine that only text 214 is on a whiteboard.

Speaker tracking unit 232 includes hardware, software, and/or firmware for identifying an active speaker 218 (or multiple speakers) in the presentation environment 210, based on video images received from video camera system 204 and/or sound data received from microphone array 206. For example, speaker tracking unit 232 may include any of the systems and methods disclosed in U.S. Pat. No. 8,248,448, the entire contents of which are hereby incorporated by reference for all purposes.

Video control unit 234 includes hardware, software, and/or firmware for selecting an area of environment 210 to display, and controlling a video feed communicated to client device 250 based on the selected area for display. In the illustrated example, video control unit 234 selects an area 260 including the identified whiteboard text area 214 and the identified active speaker 218. To control the video feed to display the selected area 260 at client device 250, the video control unit 234 may either (a) control optical parameters of video camera system 204 (e.g., optical pan, tilt, and/or zoom control), or (b) digitally select and control a partial portion of the full camera frame 220 that is displayed at client device 250 (e.g., digital pan, tilt, and/or zoom). The video feed including the selected area 260 may be displayed on a screen or other display device 252 of client device 250.

Figure 3:
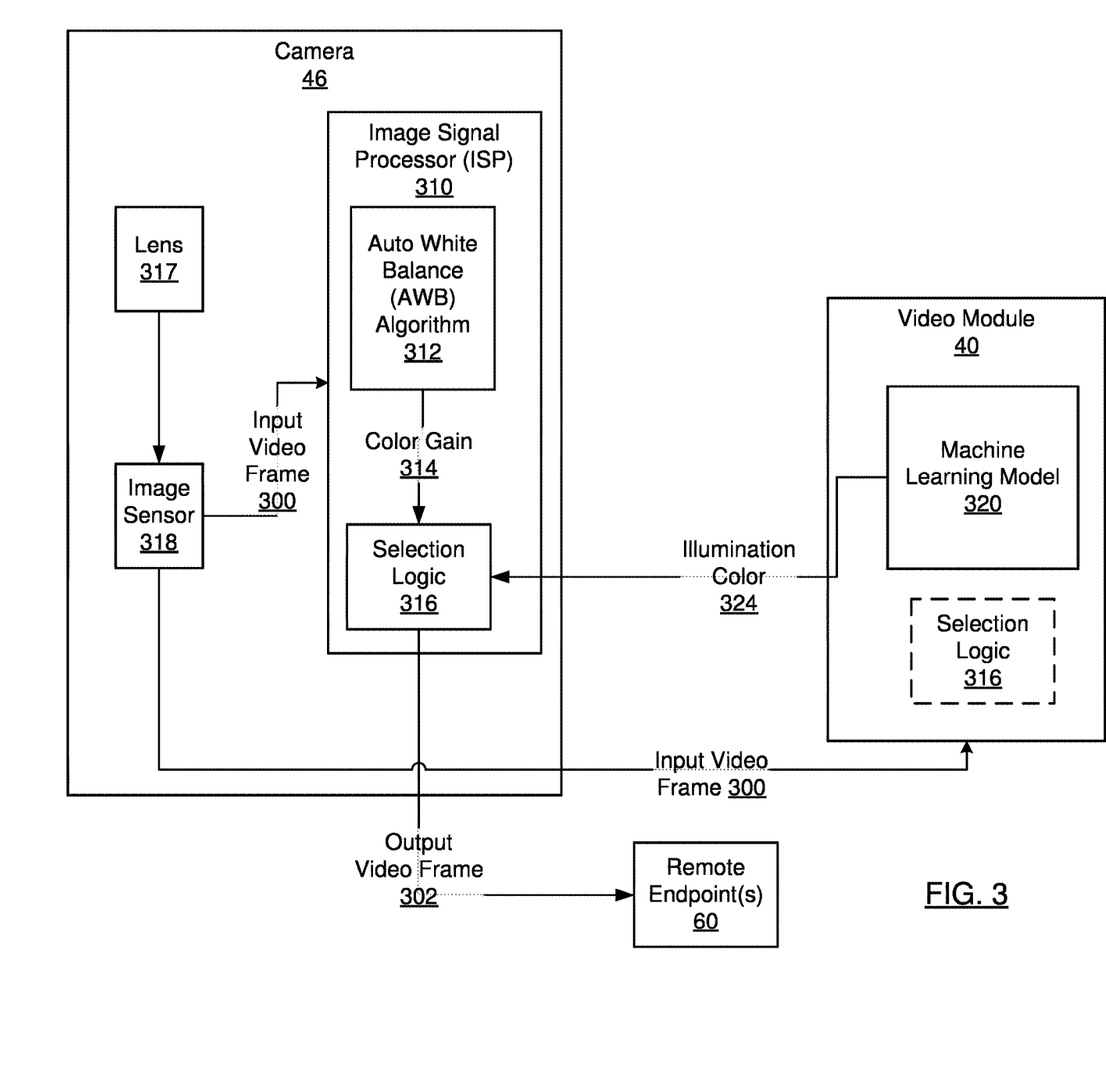
FIG. 3A shows an example method for identifying and displaying whiteboard text on a client device, according to an embodiment of the present invention.
FIGS. 3B, 3C, and 3D are example images showing the results of each step in the example method shown in FIG. 3A.
Figure 6:
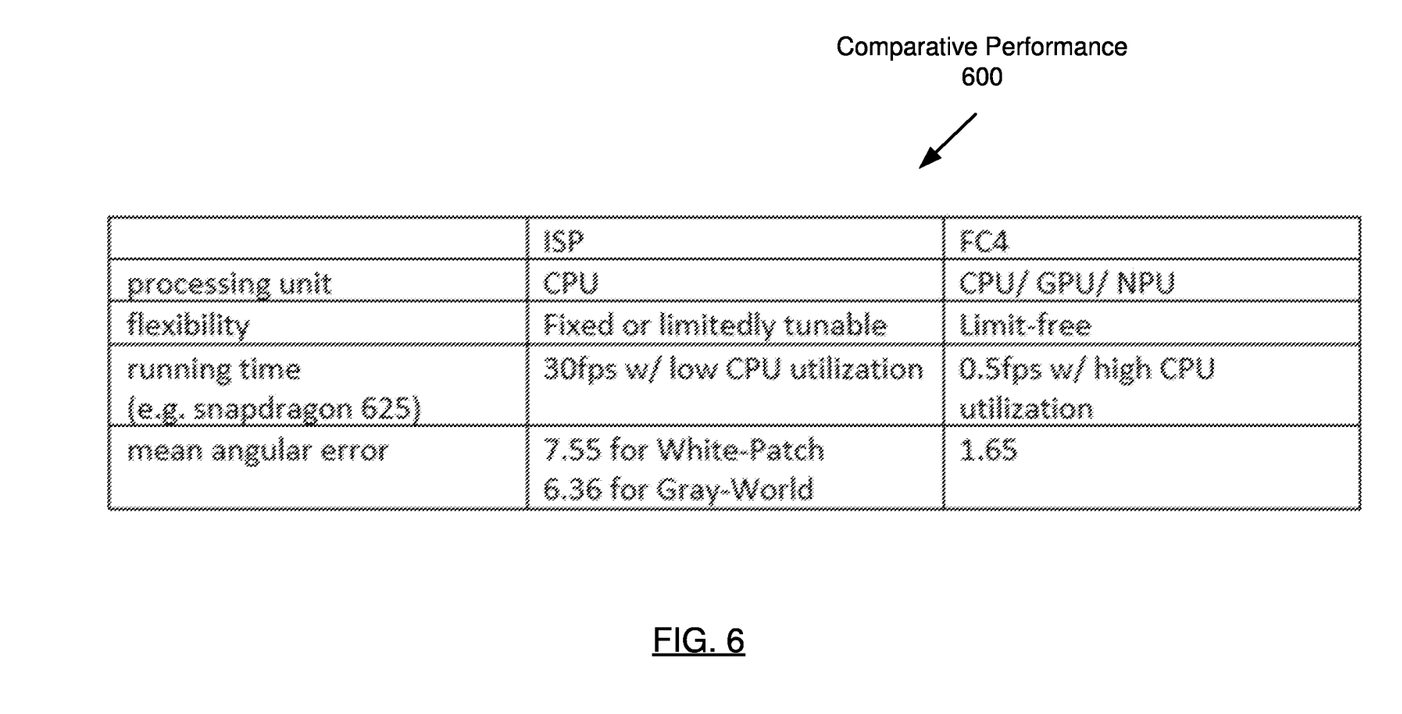

FIG. 3A shows an example method 300 for identifying and displaying whiteboard text on a client device, according to an embodiment of the present invention. FIGS. 3B, 3C, and 3D are example images showing the results of each step in method 300. Method 300 may be executed by controller 202 of system 200 shown in FIG. 2, for example.

At step 310, all text areas in the frame are identified, for example using text detection tool AdvancedEAST (https://github.com/huoyijie/AdvancedEAST). FIG. 3B shows a box around each of three text areas detected at step 310, including a first text area on a whiteboard, a second text area on a poster, and a third text area on a television. In some embodiments, a high-speed feature extractor may be used, for example MobilenetV2 (https://arxiv.org/abs/1801.04381), which is a lightweight network architecture that uses depthwise convolutions to replace original convolutional layers to filter features.

At step 320, a color filter is applied to the three detected text areas, to eliminate text areas on a non-white background. The color filter may be based on lightness and saturation statistics, for example. In the illustrated example, the color filter excludes the TV text area, as indicated in FIG. 3C.

At step 330, a whiteboard identification analysis is performed on each remaining white-background text area to determine each area is on a whiteboard. This step may utilize a deep-learning model of MobilenetV2 (or other suitable tool) that is trained for whiteboard identification using a collection of images of whiteboard and non-whiteboard objects. In the illustrated example, the whiteboard identification analysis excludes the poster text, leaving only the whiteboard text area, as indicated in FIG. 3D.

FIGS. 4A, 4B, and 4C show example selections of an area for display for three different scenarios, according to an example embodiment of the present invention. The example scenario of FIG. 4A includes whiteboard text but no active speaker in the camera frame. Thus, the disclosed systems and methods may generate a video feed of a zoomed-in view (using optical or digital zoom) of the whiteboard text.

The example scenario of FIG. 4B includes whiteboard text and an active speaker very close to the whiteboard. The disclosed systems and methods may determine that the distance between the active speaker and the whiteboard text is less than a threshold distance, and thus generate a video feed of a zoomed-in view including both the whiteboard text and at least the head of the active speaker.

The example scenario of FIG. 4C includes whiteboard text and an active speaker further away from the whiteboard. The disclosed systems and methods may determine that the distance between the active speaker and the whiteboard text exceeds the threshold distance, and thus generate a video feed of a zoomed-in view of only the speaker, and excluding the whiteboard.

FIG. 5 shows an example method 500 for identifying and displaying whiteboard text on a client device, in an example environment including an active speaker (person) presenting information using text on a whiteboard, according to an embodiment of the present invention. All or portions of method 500 may be executed by system 200 shown in FIG. 2, or a similar system, for example. In this example, system 200 includes a controller 202 connected to a video camera 204 and a microphone array 206 including multiple microphones. Thus, the description of method 500 provided below may be best understood with reference to FIG. 2

At 502, video camera 204 and microphone array 206 may generate and communicate video and sound signals to controller 202. Video camera 204 may generate and communicate to controller 202 a series of video images of a presentation environment 210 including a whiteboard 212 including text 214, a number of text-containing non-whiteboard objects 216A, 216B, and an active speaker 218. Each video image may have a frame indicated at 220, for example. Simultaneously, the microphone array 206 may to generate and communicate to controller 202 sound signals representing sound in the environment 210, including ultrasound signals and/or audible sound from the active speaker 218 and/or other audio (e.g., audio from TV 216B, ambient noise, etc.). The multiple microphones of microphone array 206 may be spaced apart from each other (either within a common housing or in distinct spaced-apart housings) and/or oriented at different angles, such that sound signals generated by the multiple microphones may be used to determine the location of a source of noise, for example, to determine the location of the active speaker 218 (e.g., using sound source localization techniques).

At 504, controller 202 may analyze video images received from camera 204 to detect each text-containing area in the video frame 220 of the video images, including a poster text 216A, text displayed on TV 216B, and the text area 214 on whiteboard 212. In some embodiments, controller 202 may use a text detection tool, for example, AdvancedEAST (https://github.com/huoyijie/AdvancedEAST) and/or a high-speed feature extractor, for example MobilenetV2 (https://arxiv.org/abs/1801.04381), as discussed above.

After detecting the multiple text-containing areas in the video frame 220, controller 202 may analyze each text-containing area to determine whether the respective text-containing area is on a whiteboard or on a non-whiteboard object. For example, at 506, controller 202 may utilize a color filter to eliminate each text-containing area having a non-white background, such that each remaining text-containing area has a white background, and at 508, controller 202 may determine whether each remaining text-containing area having a white background is an area of whiteboard.

The color filter applied at 506 may analyze each text area based on lightness and saturation statistics, for example. In the example shown in FIG. 2, the color filter may eliminate the TV text area, but leave a white-background poster text area 216A and whiteboard text area 214. The analysis of each remaining white-background text area at 508 (in this example, poster text area 216A and whiteboard text area 214) may utilize a deep-learning model, e.g., a MobilenetV2 model, trained for whiteboard identification using a collection of images of whiteboard and non-whiteboard objects (stored in memory accessible to controller 202), or any or other suitable analysis tools. In the illustrated example, the whiteboard identification analysis excludes the poster text area 216A, leaving only the whiteboard text area 214.

In addition to identifying whiteboard text area 214, controller 202 may also automatically detect the presence and/or location of the active speaker 218 in the video frame 220 (e.g., simultaneously with, before, after, or in an alternating manner with the whiteboard text identification). In one embodiment, at 510, controller 210 may analyze both (a) video images from camera 204 and (b) sound signals from microphone array 206 to detecting the presence and/or location of an active speaker 218 in the frame 220. For example, controller 202 may detect, locate, and/or track the active speaker 218 by (a) applying suitable object identification and/or motion detection algorithms to video images from camera 204, e.g., including any algorithms or techniques disclosed in U.S. Pat. No. 8,248,448, the entire contents of which are hereby incorporated by reference for all purposes, and (b) applying audio-based location detection algorithms to sound signals from the multiple microphones of microphone array 206, e.g., including any algorithms or techniques disclosed in U.S. Pat. No. 8,249,298, entitled "Ultrasonic Camera Tracking System and Associated Methods" and filed Oct. 15, 2007, the entire contents of which are hereby incorporated by reference for all purposes.

Controller 202 may then select an area of view, e.g., a subset of the full video image frame 220, to be displayed by client device(s) 250, based at least on (a) the presence or absence of the active speaker 218 in the frame 220, (b) the location of the active speaker 218, if present, and/or (c) the location and/or size of the identified whiteboard text area 214. In one embodiment, controller 202 may determine whether to (a) select an area of view that includes only the whiteboard text area 214 but not an active speaker (e.g., if no active speaker is detected), (b) select an area of view that includes both the whiteboard text area 214 and a detected active speaker 218 (or at least the speaker's head), or (c) select an area of view that includes a detected active speaker 218 (or at least the speaker's head) but not the whiteboard text area 214, based on one or more defined view selection factors.

View selection factors may include one or more of, for example, (a) the presence or absence of an active speaker 218 in the frame 220, (b) a determined distance between the whiteboard text area 214 and the active speaker 218 (e.g., a distance between a defined midpoint of each object, or a distance between the nearest edges or points of the whiteboard text area 214 and the active speaker 218, or a distance between the most distant edges or points of the whiteboard text area 214 and the active speaker 218), (c) a size or zoom factor of the smallest area of view that includes both the whiteboard text area 214 and the active speaker 218, (d) a percentage of the view area filled by the whiteboard text area 214 and the active speaker 218 in the smallest area of view that includes both the whiteboard text area 214 and active speaker 218, (e) a determined size, sharpness, focus, or other quality of the whiteboard text in a smallest area of view that includes both the whiteboard text area 214 and the active speaker 218, or any other suitable factors.

In one embodiment, at 512 controller 202 may first determine whether an active speaker 218 has been detected in the environment 210. If not, at 514, controller 202 may select the smallest area of view that includes the detected whiteboard text area 214, along with a defined buffer region around the whiteboard text area 214, for example as shown in the example view of FIG. 4A.

Alternatively, if controller 202 has detected an active speaker 218 in the environment 210, the method may proceed to steps 516-522 to select an area of view that includes the active speaker 218 (or at least a portion thereof) and, if appropriate, the whiteboard text area 214.

In the illustrated embodiment, at 516, controller 202 may determine a distance between the nearest points of the active speaker 218 and the whiteboard text area 214, e.g., as defined by a number of pixels or percentage of the full lateral width of the video frame 220. At 518, controller 202 may compare the determined distance to a defined threshold distance. If the determined distance between the active speaker 218 and whiteboard text area 214 is less than the defined threshold distance, at 520 controller 202 selects an area of view that includes both the whiteboard text area 214 and the active speaker 218 (or at least the speaker's head), using any rules for defining the selected area. For example, controller 202 may select the smallest area of view that includes the full whiteboard text area 214, the head of the active speaker 218, along with a defined buffer region around the whiteboard text area 214 and head of speaker 218.

If the determined distance between the active speaker 218 and whiteboard text area 214 is greater than or equal to the defined threshold distance, at 522 controller 202 selects an area of view that includes the active speaker 218 (or at least the speaker's head), and excludes the whiteboard text area 214, using any rules for defining the selected area. For example, controller 202 may select the smallest area of view that includes the speaker's head and shoulders, along with a defined buffer region around the head and shoulders.

After selecting the area of view to be displayed at remote client device(s) 250, controller 202 may generate a video feed based on the selected area of view at 524, and communicate the video feed to client device(s) 250 at 526. Each client device 250 may then display the video feed, showing the selected area of view, at a display screen 252 of the respective client device 250.

Controller 202 may generate the video feed based on the selected area of view at 524 in various manners, depending on the particular embodiment. In one embodiment, controller 202 may receive full frame images from video camera 204 and perform digital pan, tilt and/or zoom functions to select (i.e., digitally focus on) the selected area of view, e.g., including the active speaker 218 or including both the active speaker 218 and the whiteboard text area 214, as discussed above. In another embodiment, controller 202 may control the video camera 204 to perform optical pan, tilt and/or zoom functions to focus on the selected area of view, such that the video frame captured by the camera 204 matches the selected area of view.

The method may return to 502 to dynamically adjust the selected area of view, e.g., as a function of movements by the active speaker 218 and/or changes in the whiteboard text area 214 (e.g., as the speaker adds more text or erases text on the whiteboard).

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "unit", and "system" are intended to encompass hardware, software, firmware, or any combination thereof. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A system for identifying whiteboard text, comprising:
 a video camera system including at least one camera, each camera configured to capture video images showing an environment including at least one whiteboard;
 a controller communicatively coupled to the video camera system, the controller comprising at least one processor configured to:
  receive a series of video images captured by the at least one camera of the video camera system;
  analyze at least one video image of the series of video images to detect at least one text-containing area in the environment;
  after detecting at least one text-containing area in the environment, analyze each text-containing area to determine whether the respective text-containing area is a text-containing whiteboard area;
  in response to determining that a first text-containing area is a text-containing whiteboard area, select an area of view for display that includes the text-containing whiteboard area;
  generate a video feed from video images captured by the video camera system for display on a remote client device; and
  control the video feed based on the selected area of view for display that includes the text-containing whiteboard area.

2. The system of claim 1, wherein the controller is configured to control the video feed by controlling the operation of a camera of the video camera system to capture the selected area of view for display.

3. The system of claim 1, wherein the controller is configured to control the camera to perform at least one of a physical pan, a physical tilt, or an optical zoom.

4. The system of claim 1, wherein the controller is configured to control the video feed by performing least one of a digital pan, a digital tilt, or a digital zoom within video images captured by the video camera system.

5. The system of claim 1, wherein the controller is configured to analyze each text-containing area to determine whether the respective text-containing area is a text-containing whiteboard area by:
 using a color filter to eliminate any text-containing areas having a non-white background, such that each remaining text-containing area has a white background; and
 determining whether each remaining text-containing area having a white background is a text-containing whiteboard area.

6. The system of claim 1, wherein the controller is further configured to:
 automatically detect a speaking person in the environment; and
 automatically select the area of view for display by selecting an area of view in the environment that includes both (a) at least a selected portion of the speaking person and (b) the text-containing whiteboard area.

7. The system of claim 6, wherein the controller is configured to automatically detect the speaking person in the environment by analyzing the at least one video image of the series of video images to detect the speaking person in the environment.

8. The system of claim 6, further comprising at least one microphone; and
 wherein the controller is configured to automatically detect the speaking person in the environment by:
  receiving sound data from the at least one microphone; and
  detecting the speaking person in the environment based at least on the received sound data from the at least one microphone.

9. The system of claim 6, comprising a microphone array including multiple microphones; and
 wherein the controller is configured to automatically detect the speaking person in the environment by:
  receiving sound data from the microphone array; and
  detecting a location of the speaking person in the environment based at least on the received sound data from the microphone array.

10. The system of claim 1, wherein the controller is configured to:
 automatically detect a speaking person in the environment;
 determine a relative distance between the detected speaking person and the text-containing whiteboard area;
 compare the relative distance between the detected speaking person and the text-containing whiteboard area to a defined threshold distance; and
 determine to include the text-containing whiteboard area in the selected area of view for display in response to determining the relative distance between the detected speaking person and the text-containing whiteboard area is less than the defined threshold distance.

11. The system of claim 1, wherein the controller is configured to:
 automatically detect a speaking person in the environment;
 determine a provisional area of view that includes both the text-containing whiteboard area and at least a portion of the detected speaking person; and analyze the provisional area of view to determine a text size or a whiteboard area size of the text-containing whiteboard area; and wherein selecting the area of view for display includes selecting the provisional area of view as the area of view for display based at least on the determined text size or whiteboard area size of the text-containing whiteboard area.

12. A method for identifying and displaying whiteboard text, comprising:
   collecting a series of video images captured by a video camera system including at least one camera, each video image showing an environment including at least one whiteboard;
   analyzing, by a controller communicatively coupled to the video camera system, at least one video image of the series of video images to detect at least one text-containing area in the environment;
   after detecting at least one text-containing area in the environment, analyzing, by the controller, each text-containing area to determine whether the respective text-containing area is a text-containing whiteboard area;
   in response to determining that a first text-containing area is a text-containing whiteboard area, automatically selecting, by the controller, an area of view for display that includes the text-containing whiteboard area; and
   generating, by the controller, a video feed from video images captured by the video camera system for display on a remote client device; and
   controlling, by the controller, the video feed based on the selected area of view for display that includes the text-containing whiteboard area.

13. The method of claim 12, comprising controlling the video feed by controlling the operation of a camera of the video camera system to capture the selected area of view for display.

14. The method of claim 12, comprising controlling the camera to perform at least one of a physical pan, a physical tilt, or an optical zoom.

15. The method of claim 12, comprising controlling the video feed by performing least one of a digital pan, a digital tilt, or a digital zoom within video images captured by the video camera system.

16. The method of claim 12, wherein analyzing each text-containing area to determine whether the respective text-containing area is a text-containing whiteboard area comprises:
   using a color filter to eliminate any text-containing areas having a non-white background, such that each remaining text-containing area has a white background; and
   determining whether each remaining text-containing area having a white background is a text-containing whiteboard area.

17. The method of claim 12, further comprising:
   automatically detecting a speaking person in the environment; and
   wherein the step of automatically selecting an area of view for display comprises selecting an area of view in the environment that includes both (a) at least a selected portion of the speaking person and (b) the text-containing whiteboard area.

18. The method of claim 17, wherein automatically detecting a speaking person in the environment comprises analyzing the at least one video image of the series of video images to detect the speaking person in the environment.

19. The method of claim 17, wherein automatically detecting a speaking person in the environment comprises:
   receiving sound data from at least one microphone; and
   detecting the speaking person in the environment based at least on the received sound data from the at least one microphone.

20. The method of claim 19, wherein automatically detecting a speaking person in the environment further comprises:
   receiving sound data from a microphone array including multiple microphones; and
   detecting a location of the speaking person in the environment based at least on the received sound data from the microphone array.

21. The method of claim 12, further comprising:
   automatically detecting a speaking person in the environment;
   determining a relative distance between the detected speaking person and the text-containing whiteboard area;
   comparing the relative distance between the detected speaking person and the text-containing whiteboard area to a defined threshold distance; and
   determining to include the text-containing whiteboard area in the selected area of view for display in response to determining the relative distance between the detected speaking person and the text-containing whiteboard area is less than the defined threshold distance.

22. The method of claim 12, further comprising:
   automatically detecting a speaking person in the environment;
   determining a provisional area of view that includes both the text-containing whiteboard area and at least a portion of the detected speaking person;
   analyzing the provisional area of view to determine a text size or a whiteboard area size of the text-containing whiteboard area; and
   wherein selecting the area of view for display includes selecting the provisional area of view as the area of view for display based at least on the determined text size or whiteboard area size of the text-containing whiteboard area.

* * * * *